(12) United States Patent
Cheong et al.

(10) Patent No.: US 8,739,057 B2
(45) Date of Patent: May 27, 2014

(54) DIAGNOSTIC SYSTEM AND METHOD FOR A MOBILE COMMUNICATION TERMINAL

(75) Inventors: Jun Cheong, Seoul (KR); Chung Han Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1101 days.

(21) Appl. No.: 12/237,769

(22) Filed: Sep. 25, 2008

(65) Prior Publication Data

US 2009/0150819 A1    Jun. 11, 2009

(30) Foreign Application Priority Data

Dec. 10, 2007    (KR) .................. 10-2007-0127505

(51) Int. Cl.
*G06F 3/048*    (2013.01)

(52) U.S. Cl.
USPC ........................... 715/771; 715/769; 715/864

(58) Field of Classification Search
CPC ...... G06F 3/041; G06F 3/3206; G06F 1/3228
USPC ................... 715/769, 771, 963, 864
See application file for complete search history.

(56) References Cited

U.S. PATENT DOCUMENTS

| | | | |
|---|---|---|---|
| 6,545,448 B1* | 4/2003 | Stanley et al. | 320/132 |
| 7,333,048 B2* | 2/2008 | Nakagawa et al. | 342/28 |
| 7,512,894 B1* | 3/2009 | Hintermeister et al. | 715/771 |
| 7,536,653 B2* | 5/2009 | Badovinac et al. | 715/810 |
| 7,805,684 B2* | 9/2010 | Arvilommi | 715/829 |
| 7,814,440 B2* | 10/2010 | Moon et al. | 715/864 |
| 2001/0018661 A1* | 8/2001 | Sato et al. | 705/5 |
| 2002/0109727 A1* | 8/2002 | Kono | 345/783 |
| 2002/0184360 A1* | 12/2002 | Weber et al. | 709/223 |
| 2004/0032507 A1* | 2/2004 | Mun | 348/207.99 |
| 2004/0076444 A1* | 4/2004 | Badovinac et al. | 399/81 |
| 2004/0090469 A1* | 5/2004 | Moon et al. | 345/846 |
| 2005/0027481 A1* | 2/2005 | Yang et al. | 702/183 |
| 2006/0083955 A1* | 4/2006 | Kanouda et al. | 429/9 |
| 2007/0073457 A1* | 3/2007 | Lee | 701/29 |
| 2007/0082707 A1* | 4/2007 | Flynt et al. | 455/564 |
| 2007/0277122 A1* | 11/2007 | Frijlink et al. | 715/854 |
| 2008/0016443 A1* | 1/2008 | Hiroshima et al. | 715/702 |
| 2008/0104639 A1* | 5/2008 | Yoon | 725/56 |
| 2008/0256473 A1* | 10/2008 | Chakra et al. | 715/772 |
| 2009/0265784 A1* | 10/2009 | Waizumi et al. | 726/23 |

* cited by examiner

*Primary Examiner* — Daeho Song
(74) *Attorney, Agent, or Firm* — Lee, Hong, Degerman, Kang & Waimey

(57) ABSTRACT

A mobile communication terminal comprising a display unit for displaying at least one or more terminal diagnostic objects, an input unit for selecting a terminal diagnostic object and a controller for diagnosing the operational state associated with the selected terminal diagnostic object is provided.

11 Claims, 11 Drawing Sheets

(a)

(b)

DIAGNOSTIC SYSTEM AND METHOD FOR A MOBILE COMMUNICATION TERMINAL

CROSS-REFERENCE TO RELATED APPLICATIONS

Pursuant to 35 U.S.C. §119(A), this application claims the benefit of the earlier filing date and right of priority to Korean Patent Application No. 10-2007-0127505, filed on Dec. 10, 2007, the contents of which is hereby incorporated by reference herein in its entirety.

FIELD OF THE INVENTION

The present invention relates to a mobile communication terminal, and more particularly, to a system and method for controlling diagnostic operations performed for various components of the mobile communication terminal.

BACKGROUND

A mobile communication terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal. In the related art, a personal computer (hereinafter abbreviated 'PC') is connected to a mobile or portable terminal and a diagnostic program (diagnostic monitor) of the mobile terminal is driven in the PC. Hence, the PC is able to diagnose operational states of the mobile terminal. However, it is inconvenient to connect the mobile terminal to the PC, each time the PC diagnoses the operational states of the mobile terminal.

In particular, in order to diagnose operational states of the mobile terminal while it is moving, it is very inconvenient to find a corresponding PC to diagnose the operational states of the mobile terminal.

SUMMARY

A mobile communication terminal comprising a display unit for displaying at least one or more terminal diagnostic objects, an input unit for selecting a terminal diagnostic object and a controller for diagnosing the operational state associated with the selected terminal diagnostic object is disclosed herein.

In one embodiment, the controller may diagnose the operational state associated with the selected terminal diagnostic object on a preset date and time. In another embodiment, the controller may display a diagnostic schedule module for setting a diagnostic schedule for the selected terminal diagnostic object. The controller may also diagnose the operational state of the terminal associated with the selected terminal diagnostic object according to the time and date set via the diagnostic schedule module.

Further, in certain embodiments the controller may display a second object indicating the operational state of the selected terminal diagnostic object on the display unit. The controller may display a third object indicating a completed status of a diagnosis associated with the selected terminal diagnostic object on the display unit. The controller may also display the summary of the diagnosis if the third object is selected.

The input unit may comprise a touchscreen, wherein the terminal diagnostic object is selected via a user's touch action, in certain embodiments. Or, the input unit may comprise at least one or more keys, wherein the terminal diagnostic object is selected via one of the at least one or more keys.

In certain embodiments, the terminal may further comprise a menu for selecting diagnostic functions, wherein one or more terminal diagnostic objects may be displayed if the menu is selected.

A method for diagnosing components of a mobile communication terminal is also provided in accordance with one embodiment. The method comprises displaying at least one menu item for diagnosing an operational state associated with at least one component of the mobile communication terminal on a screen of the mobile communication terminal, establishing an association between the first GUI object and the menu item displayed on the screen, in response to a user selecting a first graphical user interface (GUI) object displayed on the screen of the mobile communication terminal and diagnosing the first component in response to detecting the established association between the first GUI object and the menu item, wherein the first GUI object represents a first component of the mobile communication terminal, is also disclosed herein.

In certain embodiments, the method may comprise providing a diagnosis status on the screen for the first component indicating a progress level for a corresponding diagnosis operation. The method may further comprise providing a diagnosis report on the screen for the first component comprising diagnostic details for the first component. Additionally, the method may also comprise displaying a time table, in response to detecting the established association between the first GUI object and the menu item, such that a first time is scheduled for performing a diagnosis operation on the first component when a specific time is selected from the time table.

In one embodiment, the association between the first GUI object and the menu item is established by way of dragging and dropping the first GUI object in the menu item. Similarly, in certain embodiments the first time for performing the diagnosis operation on the first component is scheduled in response to dragging and dropping the first GUI object in a time slot in the time table. In other embodiments, the first time for performing the diagnosis operation on the first component is scheduled in response to dragging and dropping a time slot in the time table in the first GUI object.

The diagnosis status for the first component may be displayed in response to interacting with a graphical icon displayed on the screen. In certain embodiments, the menu item may be selected from a drop-down menu in a diagnosis menu displayed on the screen. The menu item may comprise at least one of a graphical icon, an indicator, a hyperlink or text displayed on the screen. In some embodiments, the association between the first GUI object and the menu item is established by way of a user interacting with a user interface of the mobile communication terminal. The user interface may comprise at least one of a keypad, a keyboard, a touch screen, a joystick, a roller ball, a key, a scroll wheel or a pointing device.

BRIEF DESCRIPTION OF THE DRAWINGS

The accompanying drawings, which are included to provide a further understanding of the mobile terminal and are incorporated in and constitute a part of this application, illustrate embodiment(s) of the mobile terminal and together with the description serve to explain the principle of the mobile terminal.

Reference will now be made in detail to the preferred embodiments of the mobile terminal, examples of which are illustrated in the accompanying drawings. It is to be understood by those of ordinary skill in this technological field that other embodiments may be utilized, and structural, electrical, as well as procedural changes may be made without departing from the scope of this disclosure. Wherever possible, the same reference numbers will be used throughout the drawings to refer to the same or like parts.

DETAILED DESCRIPTION OF EXAMPLE EMBODIMENTS

Figure 1:
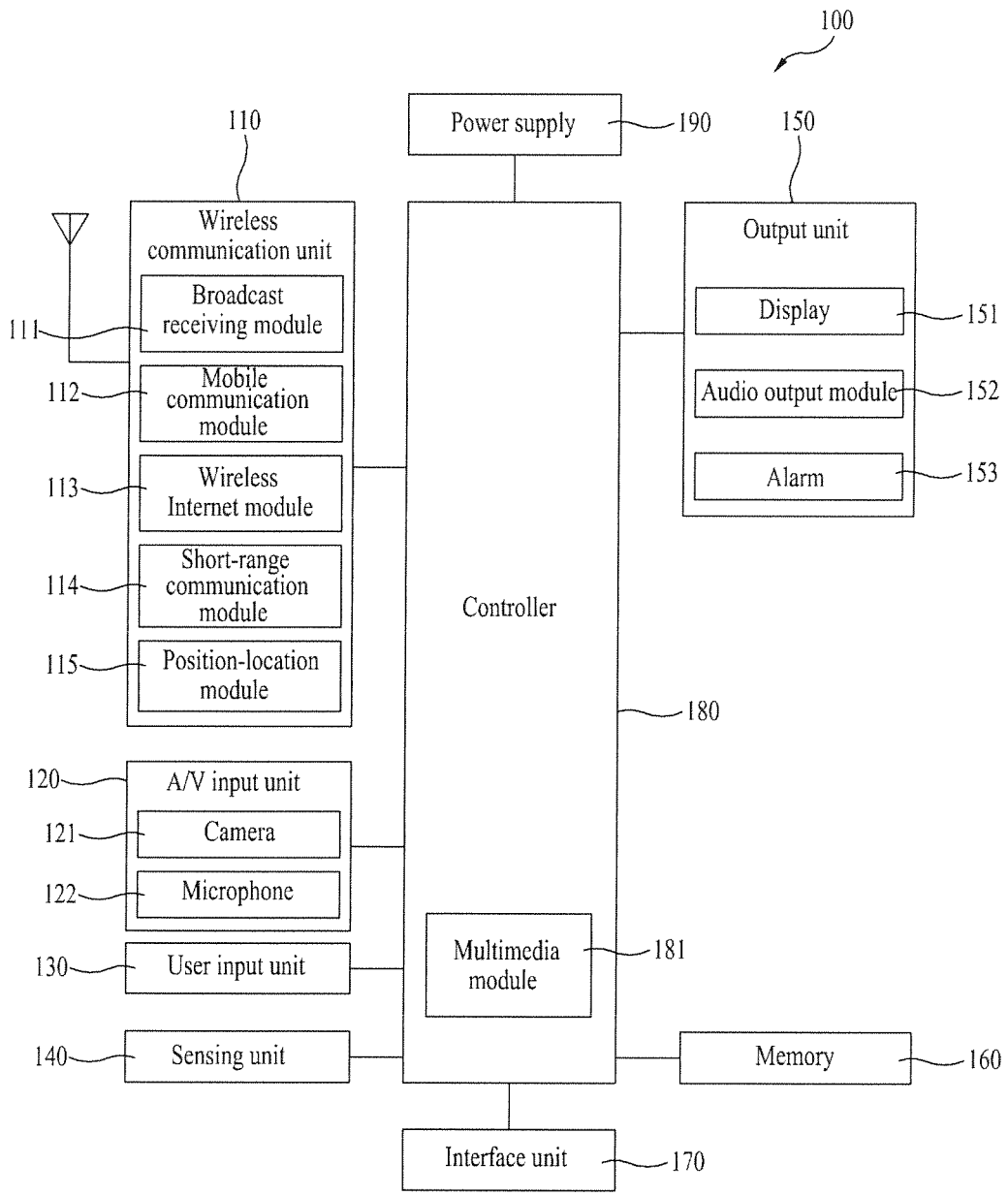
FIG. 1 is a block diagram of a mobile terminal in accordance with one embodiment.

Referring to FIG. 1, a mobile terminal 100 may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permit wireless communication between the mobile terminal 100 and a wireless communication system or network within which the mobile terminal 100 is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, or a data broadcast signal, without limitation. If desired, the broadcast signal may further include a broadcast signal combined with a TV or radio broadcast signal.

The broadcast receiving module 111 may be configured to receive broadcast signals transmitted from various types of broadcast systems. For example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, or data, among others.

The wireless internet module 113 supports Internet access for the mobile terminal 100. The wireless internet module 113 may be internally or externally coupled to the mobile terminal 100.

The short-range communication module 114 facilitates relatively short-range communications. For example, suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal 100. If desired, the position location module 115 may be implemented using global positioning system (GPS) components which cooperate with associated satellites, network components, and combinations thereof.

Audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

The microphone 122 receives an external audio signal while the mobile terminal is in a particular mode, such as phone call mode, recording mode and voice recognition. This audio signal is processed and converted into digital data. The mobile terminal 100, and in particular, A/V input unit 120, typically include assorted noise removing algorithms to remove noise generated in the course of receiving the external audio signal. Data generated by the A/V input unit 120 may be stored in memory 160, utilized by output unit 150, or transmitted via one or more modules of wireless communication unit 110. If desired, two or more microphones and/or cameras may be used.

The user input unit 130 generates input data responsive to user manipulation of an associated input device or devices. Examples of such devices include, but are not limited to, a keypad, a dome switch, a touchpad (e.g., static pressure/capacitance), a jog wheel or a jog switch. A specific example is one in which the user input unit 130 is configured as a touchpad in cooperation with a touchscreen display (which will be described in more detail below).

The sensing unit 140 provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, or orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal 100 is open or closed. Other examples include the sensing unit 140 sensing the presence or absence of power provided by the power supply 190, or the presence or absence of a coupling or other connection between the interface unit 170 and an external device.

The interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal 100. Display 151 is typically implemented to visually display information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display or a three-dimensional display. The mobile terminal 100 may include one or more of such displays. An example of a two-display embodiment is one in which one display is configured as an internal display (viewable when the mobile terminal 100 is in an opened position) and a second display configured as an external display (viewable in both the open and closed positions).

Moreover, the touchscreen can be configured to detect a touch input pressure as well as a touch input position and area. Meanwhile, a proximity sensor (not shown in the drawing) can be provided within or in the vicinity of the touch screen. In this case, the proximity sensor is the sensor for detecting a presence or non-presence of object, which approaches a prescribed detecting surface or exists in the vicinity, without mechanical contact using an electromagnetic force or IR. Therefore, the proximity sensor has durability considerably longer than that of a contact sensor and also has considerable practical applications.

For illustration purposes, the proximity sensor works according to the following principle:. If a high frequency sine wave is oscillating from an oscillation circuit, and an object approaches a sensor detecting surface, the oscillation amplitude of the oscillation circuit is attenuated, or stops. Such a variation can be converted to an electric signal to detect the presence or non-presence of an object. Therefore, if any substance other than a metallic substance is placed between the high frequency oscillation proximity sensor and the object to be detected, the proximity switch is able to detect the object without interference with the substance in-between.

FIG. 1 further shows output unit 150 having an audio output module 152 which supports the audio output requirements of the mobile terminal 100. The audio output module 152 is often implemented using one or more speakers, buzzers, other audio producing devices, and combinations thereof. The audio output module 152 functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal 100. Typical events include call received, message received and user input received. An example of such output includes the providing of tactile sensations (e.g., vibration) to a user. For instance, the alarm 153 may be configured to vibrate responsive to the mobile terminal 100 receiving a call or message. As another example, vibration is provided by alarm 153 responsive to receiving user input at the mobile terminal 100, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal 100. Examples of such data include program instructions for applications operating on the mobile terminal 100, contact data, phonebook data, messages, pictures, video, etc. Memory 160 is provided with software for diagnosing each operational state of the mobile terminal 100. The software and a process for diagnosing each operational state of the mobile terminal 100 will be explained in detail later.

The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal 100. For instance, the controller 180 performs the control and processing associated with voice calls, data communications, video calls, camera operations and recording operations. If desired, the controller 180 may include a multimedia module 181 which provides multimedia playback. The multimedia module 181 may be configured as part of the controller 180, or may be implemented as a separate component. Moreover, the controller 180 is able to perform a pattern recognizing process for recognizing a handwriting/drawing input performed on the touchscreen as character/image.

The power supply 190 provides power required by the various components for the mobile terminal. The provided power may be internal power, external power, or combinations thereof. Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

In software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However, such teachings apply equally to other types of terminals.

Figure 2:
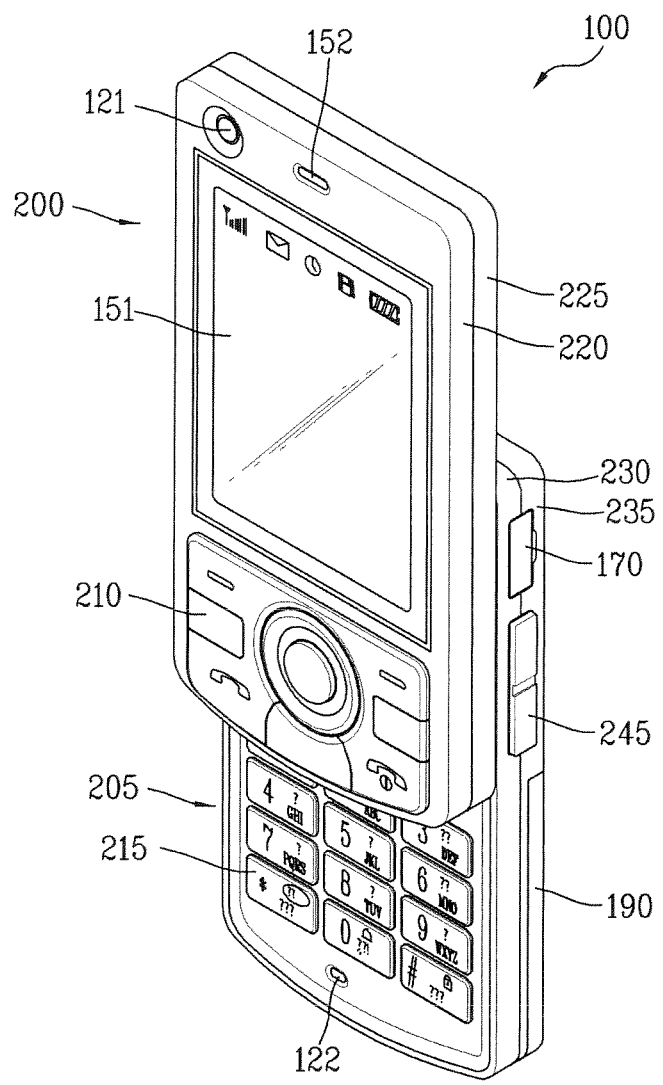
FIG. 2 is a perspective view of a front side of a mobile terminal according to one embodiment.

FIG. 2 is a perspective view of a front side of a mobile terminal according to one embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad 215 includes various keys (e.g., numbers, characters, and symbols) to enable a user to place a call, prepare a text or multimedia message, and otherwise operate the mobile terminal 100.

The first body 200 slides relative to second body 205 between open and closed positions. In a closed position, the first body 200 is positioned over the second body 205 in such a manner that the keypad 215 is substantially or completely obscured by the first body 200. In the open position, user access to the keypad 215, as well as to the display 151 and function keys 210, is possible. The function keys 151 are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) or titanium (Ti). If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display 151 may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys 245 are associated with a particular function of the mobile terminal 100. An interface unit 170 is shown positioned adjacent to the side keys 245, and a power supply 190 in a form of a battery is located on a lower portion of the second body 205.

Figure 3:
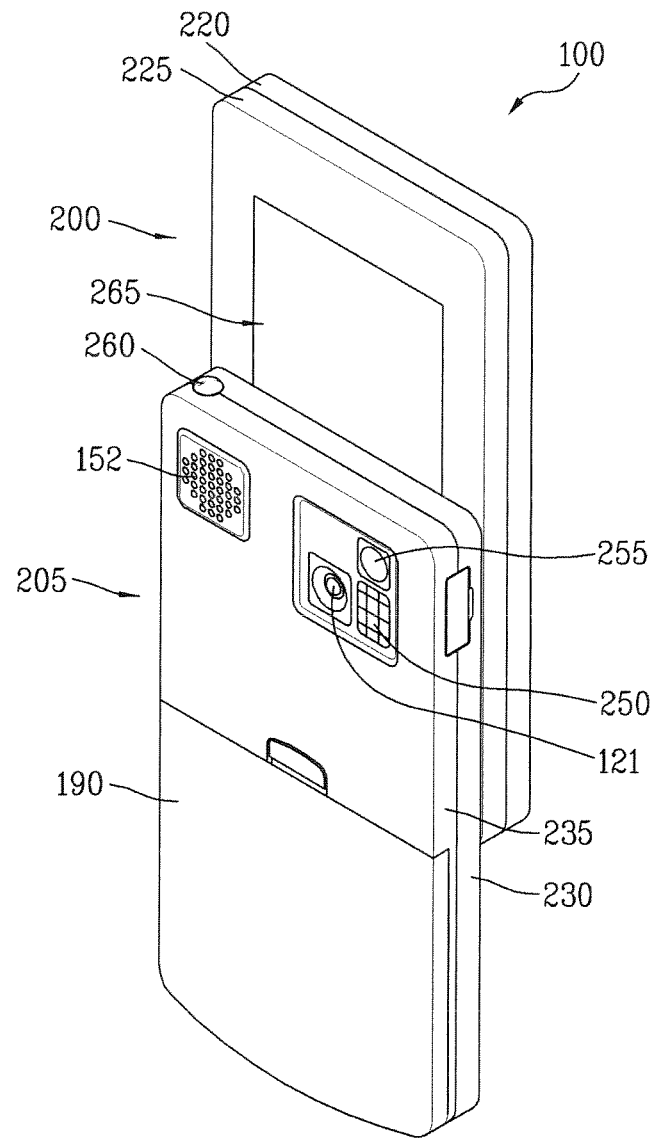
FIG. 3 is a rear view of the mobile terminal shown in FIG. 2.

FIG. 3 is a rear view of the mobile terminal 100 shown in FIG. 2. FIG. 3 shows the second body 205 having a camera 121, and an associated flash 250 and mirror 255. The flash 250 operates in conjunction with the camera 121 of the second body 205. The mirror 255 is useful for assisting a user to position the camera 121 in a self-portrait mode. The camera 121 of the second body 205 faces a direction which is opposite to a direction faced by camera 121 of the first body 200 (FIG. 2). Each of the cameras 121 of the first and second bodies 200, 205 may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body 205. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
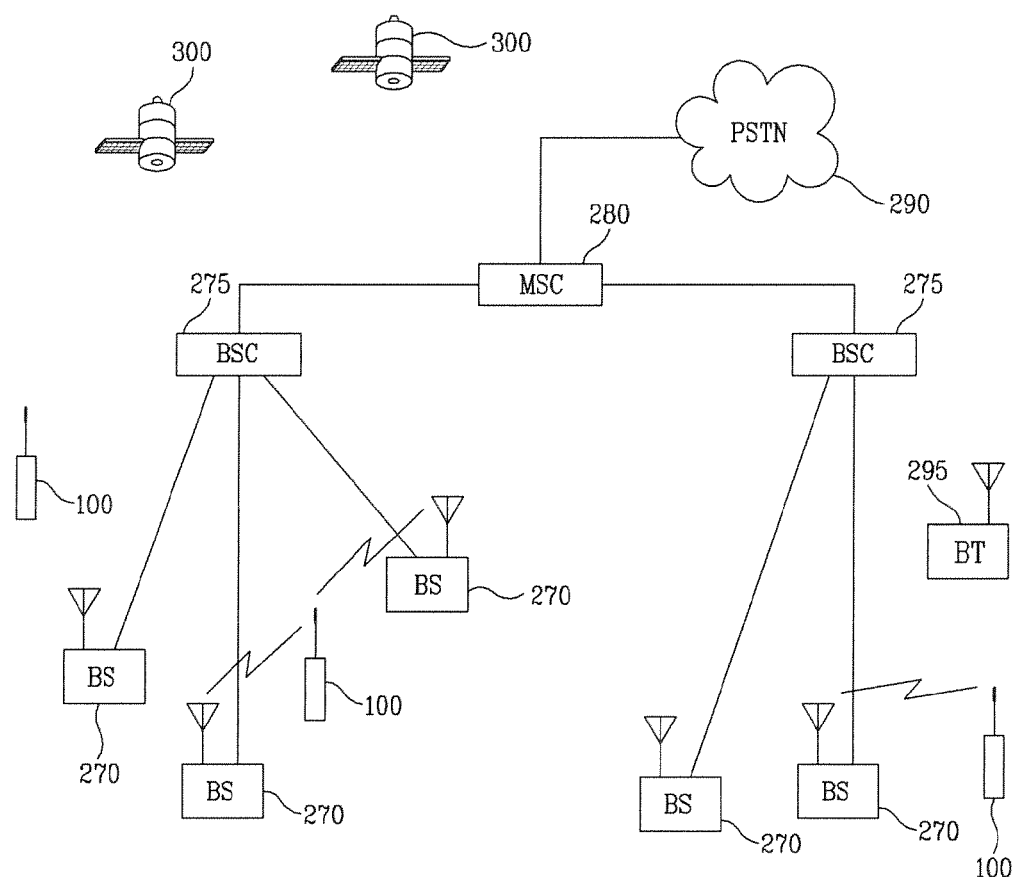
FIG. 4 is a block diagram of a CDMA wireless communication system operable with the mobile terminal of FIGS. 1-3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omni directional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted "cell sites." Alternatively, individual sectors of a given base station 270 may be referred to as cell sites.

A broadcasting transmitter 295 is shown broadcasting to mobile terminals 100 operating within the system. The broadcast receiving module 111 (FIG. 1) of the mobile terminal 100 is typically configured to receive broadcast signals transmitted by the broadcasting transmitter 295. Similar arrangements may be implemented for other types of broadcast and multicast signaling (as discussed above).

FIG. 4 further depicts several global positioning system (GPS) satellites 300. Such GPS satellites 300 facilitate locating the position of some or all of the mobile terminals 100. Two satellites 300 are depicted, but it is understood that useful positioning information may be obtained with greater or fewer satellites 300. The position-location module 115 (FIG. 1) of the mobile terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

In the following description, a diagnostic function for diagnosing each operational state of the above-configured mobile terminal 100 is explained in detail. Specifically, a first embodiment of the present invention relates to a process for diagnosing each operational state of the mobile terminal 100 within a menu function and a second embodiment of the present invention relates to a process for diagnosing each operational state of the mobile terminal 100 on a background picture.

Figure 5:
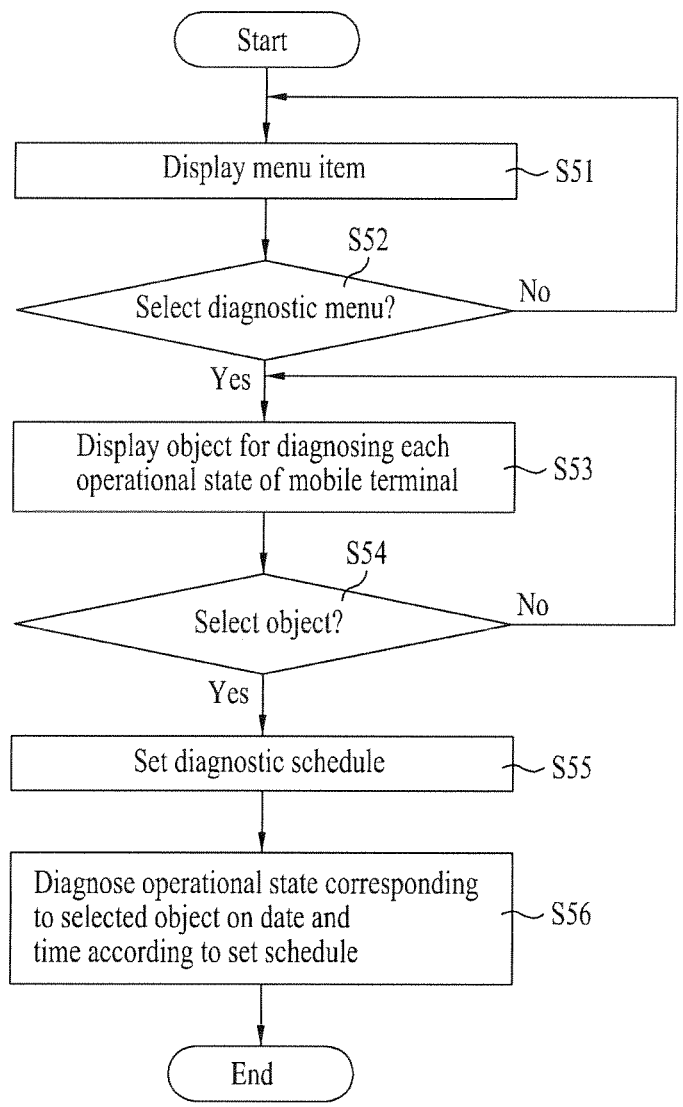
FIG. 5 is a flowchart for a method of diagnosing operational states of a mobile terminal according to a first embodiment.

FIG. 5 is a flowchart for a method of diagnosing operational states of a mobile terminal 100 according to a first embodiment. Prior to describing a first embodiment, a diagnostic function for the diagnostics and monitoring (hereinafter abbreviated 'DM) of each operational state of the mobile terminal 100 is explained as follows.

The diagnostic function is the function for diagnosing and monitoring states of various functions used by the mobile terminal 100 and also diagnosing and monitoring whether various data values for the various functions performed in normal operation mode. Targets for the diagnostics and monitoring can include a function loaded in the mobile terminal 100, such as a reception sensitivity state of the antenna of the mobile communication module 112, a reception sensitivity of an antenna of the broadcast receiving module 111, a battery state (e.g., charging state), a state of the memory 160, a display state of the display module 151, an audio output state of the audio output module 152, a state of the camera 121 and the like.

In the following description, the above diagnostic functions are displayed as individual graphical user interface objects (e.g., icons). A user is able to facilitate diagnosis of an operational state of the user's mobile terminal 100 by conveniently selecting the objectified diagnostic icon through a touchscreen or direction keys.

Referring to FIG. 5, menu function items may be displayed for selection by a user on a display of the mobile terminal 100 [S51]. If a user selects a diagnostic menu for diagnosing an operational state of the mobile terminal 100 [S52], the controller 180 displays icon type objects for diagnosing operational states of the mobile terminal 100 on the display module 151 by controlling the diagnostic software provided to the memory 160 [S53].

Figure 6:
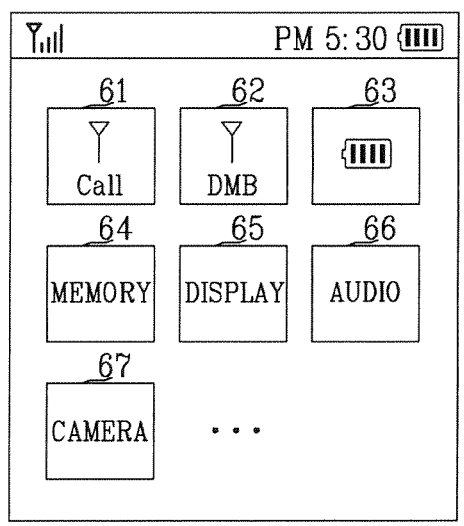
FIG. 6 is an exemplary diagram of screen configuration for displaying objects to diagnose operational states of a mobile terminal in accordance with one embodiment.

In the following description, objects according to the present embodiment are explained with reference to FIG. 6. FIG. 6 is an exemplary diagram of screen configuration for displaying objects to diagnose operational states of a mobile terminal 100 in accordance with one embodiment.

Referring to FIG. 6, the objects are provided to represent operational states 61, 62, 63, 63, . . . of the mobile terminal 100 as user-friendly shapes on the screen. The objects are able to indicate at least one of a reception sensitivity state 61 of the antenna of the mobile communication module 112, a reception sensitivity 62 of an antenna of the broadcast receiving module 111, a battery state 63, a memory state 64 of the memory 160, a display state 65 of the display module 151, an audio output state 66 of the audio output module 152, a capture state 67 of the camera 121, and the like.

In this case, the objects can include at least one of a text, an image, an icon, a 3-dimensional image and an animation or any combination thereof. And, the objects can be downloaded from a web or an external PC via the wireless communication unit 110 or the interface 170. The objects can be displayed as a scroll form in a manner of being scrolled by being aligned in a second direction from a first direction. Alternatively, the objects can be displayed as a grid or list.

If at least one of the objects for diagnosing an operational state is selected from the displayed objects through the user input unit 130 or the touchscreen type display module 151 [S54] and if a schedule for diagnosing the selected object is set [S55], the controller 180 diagnoses the operational state corresponding to the selected object on the time and date according to the set schedule by controlling the diagnostic software provided to the memory 160 [S56].

In this case, the diagnostic schedule can be set in advance by a user. If the object is selected, the controller 180 is able to diagnose the operational state corresponding to the selected object according to the diagnostic schedule having bee set in advance by the user. Moreover, while the object is selected, the controller 180 is able to directly perform a diagnostic action at the current time if the diagnostic schedule is not set.

If a plurality of objects are selected and if the diagnostic schedules of a plurality of the selected objects are identical to each other, the controller 180 is able to perform the diagnostic actions by determining orders of the objects according to the preset priorities.

Figure 7:
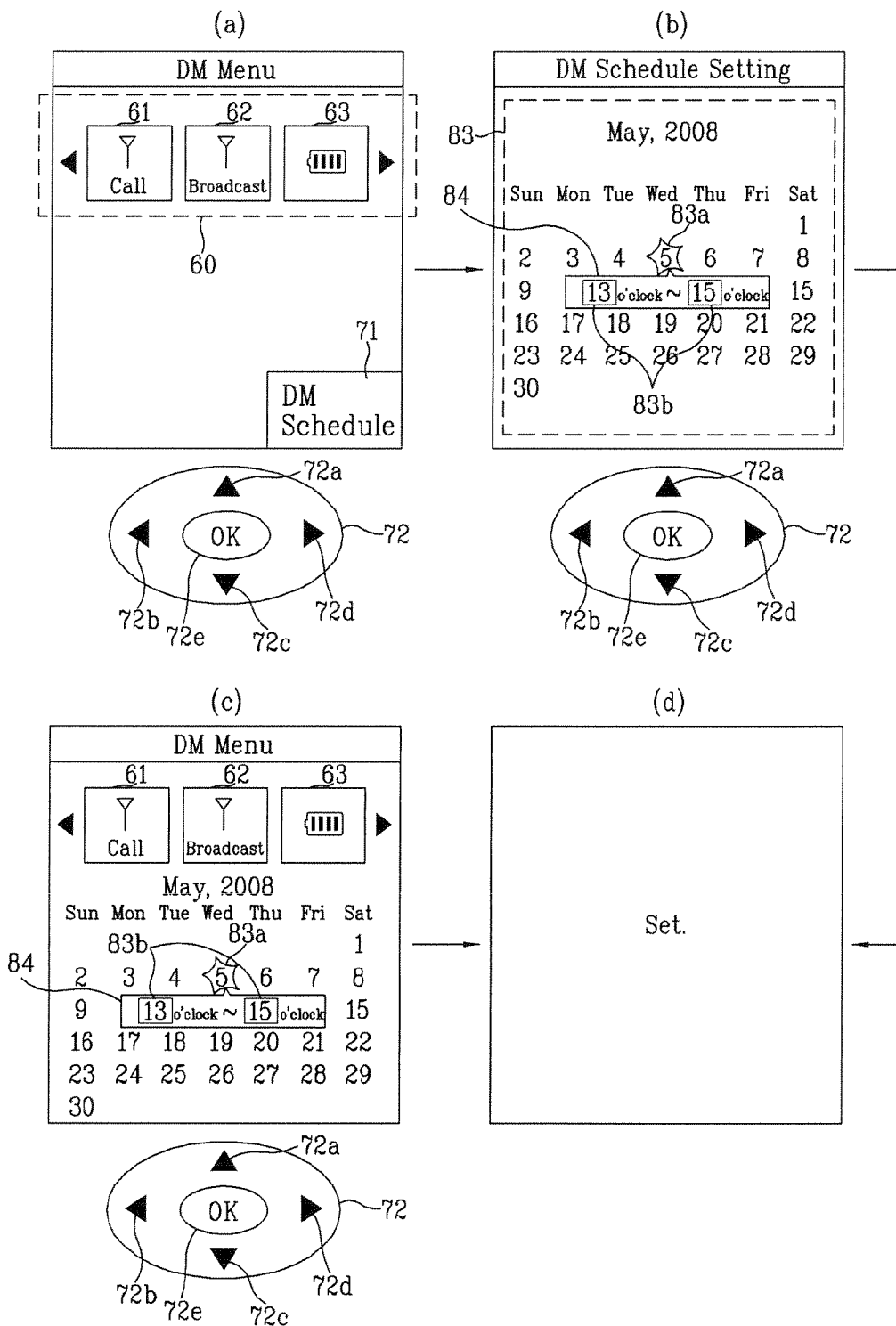
FIG. 7 is a diagram of screen configurations for a process for setting a schedule of a diagnostic function using direction keys in accordance with one embodiment.

In the following description, the diagnostic schedule setting process is explained in detail with reference to FIG. 7 and FIG. 8. FIG. 7 is a diagram of screen configurations for a process for setting a schedule of a diagnostic function using direction keys in accordance with one embodiment.

Referring to FIG. 7(a), if a diagnostic menu is selected by a user, objects 60 for diagnosing each operational state of the mobile terminal 100 are displayed on a picture according to the diagnostic menu. Navigations key 72, which is a type of user input unit 130 for setting the objects 60 and a diagnostic schedule, is displayed on a bottom of the diagnostic menu picture.

Among the objects 60 shown in FIG. 7(a), the object corresponding to a reference number '61' is the object for diagnosing an antenna reception sensitivity state of the mobile communication module 112, the object corresponding to a reference number '62' is the object for diagnosing an antenna reception sensitivity state of the broadcast receiving module 111, and the object corresponding to a reference number '63' is the object for diagnosing a battery state.

After a user has selected the object for diagnosing the state of the battery 63 by manipulating directions keys 72a, 72b, 72c and 72d of the navigation key 72, if the user presses a key 71 for setting the diagnostic schedule of the selected object 63, the controller 180, as shown in FIG. 7(b), displays a window 83 for setting the diagnostic schedule of the selected object 63 on the diagnostic menu picture. In this case, the diagnostic schedule includes data and time zone.

The setting window 83 can be represented as a calendar shown in FIG. 7(b) or an input window (not shown in the drawing) for inputting date and time zone. If the setting window 83 is displayed as the input window for inputting the date and time zone, the user is able to enter a diagnostic date and time zone by manipulating numeral keys provided to the user input unit 130.

If the setting window 83 is represented as the calendar shown in FIG. 7(b), since the calendar includes dates and days of the week only, it is unable to set the diagnostic time zone. Therefore, if the user selects a date 83a to diagnose, a time setting window 84 for setting the diagnostic time zone within the diagnostic date 83a is additionally displayed.

Once the diagnostic time zone 83b is set through the time setting window 84, the controller 180, as shown in FIG. 7(d), stores the set diagnostic date 83a and the diagnostic time zone 83b in the memory 160 by linking them with the selected object 63. And, the controller 180 drives diagnostic software provided to the memory 160 and then diagnoses an operational state corresponding to the selected object 63 on the set diagnostic date 83a and the set diagnostic time zone 83b.

Referring to FIG. 7(c), the controller 180 is able to display both of the objects 60 for diagnosing the respective operational states of the mobile terminal 100 and the window 83 for setting the diagnostic schedules of the objects 60 on the same picture together.

Figure 8:
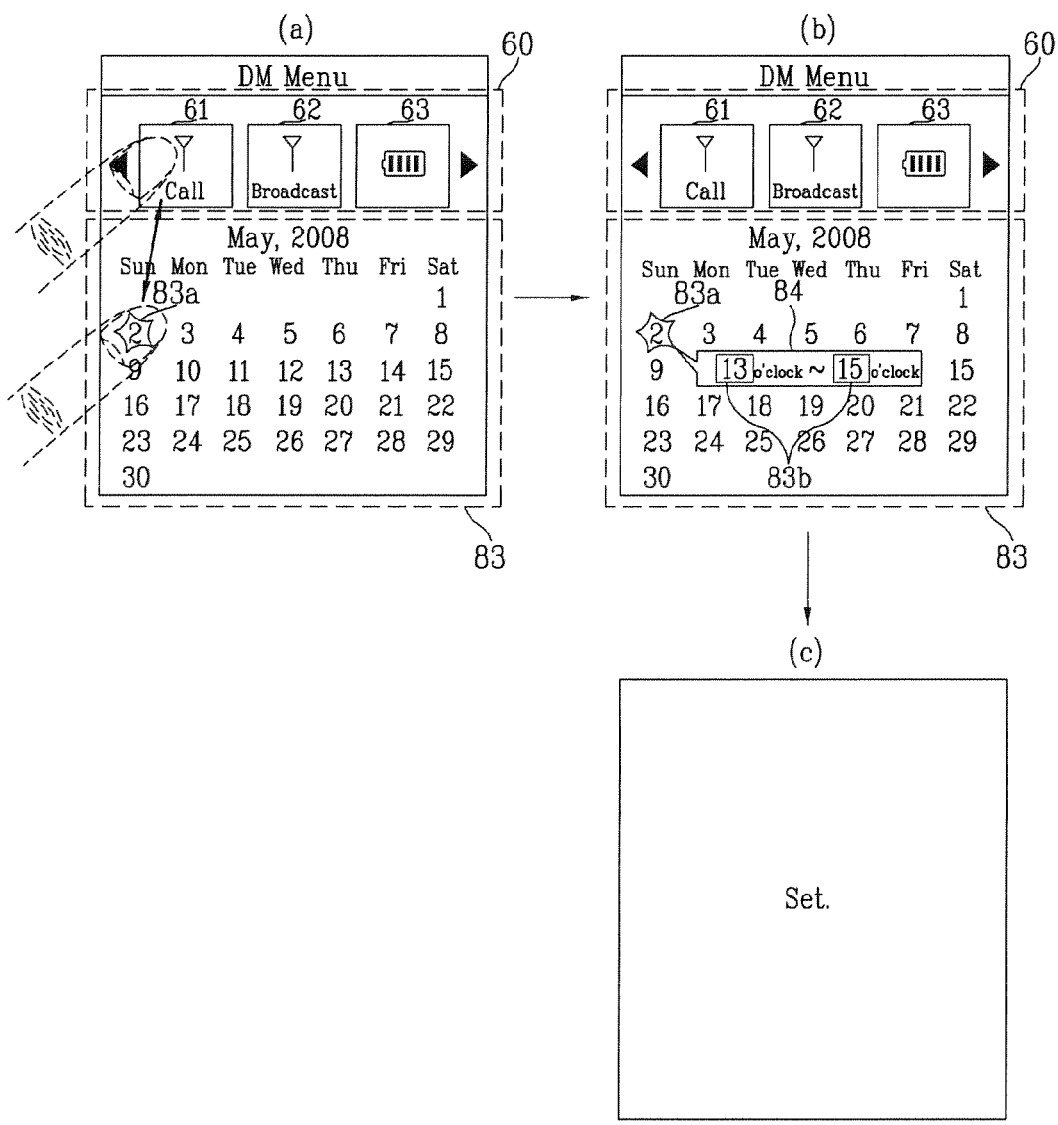
FIG. 8 is a diagram of screen configurations for a process for setting a schedule of a diagnostic function using a touch screen in accordance with one embodiment.

FIG. 8 is a diagram of screen configurations for a process for setting a schedule of a diagnostic function using a touch screen in accordance with one embodiment. Referring to FIG. 8(a), objects 60 for diagnosing operational states of the mobile terminal 100 and a window 83 for setting diagnostic schedules of the objects 60 are displayed on a display screen of a touchscreen 151.

Among the objects 60 shown in FIG. 8(a), the object corresponding to a reference number '61' is the object for diagnosing an antenna reception sensitivity state of the mobile communication module 112, the object corresponding to a reference number '62' is the object for diagnosing an antenna reception sensitivity state of the broadcast receiving module 111, and the object corresponding to a reference number '63' is the object for diagnosing a battery state.

The setting window 83 can be represented as a calendar shown in FIG. 8(a) or an input window (not shown in FIG. 8(a)) for inputting date 83a and time zone 83b. If the setting window 83 is displayed as the input window for inputting the date and time zone, the user is able to enter a diagnostic date 83a and time zone 83b by manipulating numeral keys provided to the user input unit 130.

Referring to FIG. 8(a), if a user touches a date 83a for diagnosing the selected object 61 while touching the selected object 61, or if the user touches the selected object 61 while touching the date 83a, the controller 180 additionally displays a time setting window 84 for setting a diagnostic time zone within the date 83a.

If a user drags and drops the object 61 for diagnosing an operational state among the objects 60 to the date 83a or drags and drops the date 83a to the selected object 61, the controller 180 additionally displays a time setting window 84 for setting the diagnostic time zone 83b within the date 83a.

If a diagnostic time zone 83b is set through the time setting window 84, the controller 180, as shown in FIG. 8(c), stores the set diagnostic date 83a and the set diagnostic time zone 83b in the memory 160 by linking them with the selected object 61. The controller 180 drives the diagnostic software and then diagnoses the operational state corresponding to the selected object 61 on the set diagnostic date 83a and the set diagnostic time zone 83b.

If a user touches a date of a current timing point among dates while touching the selected object 61, or if a user touches the selected object 61 while touching a sate of a current timing point, the controller 180 drives the diagnostic software and is then able to directly diagnose the operational state corresponding to the selected object 61.

If a user drags and drops the selected object 61 to a date of a current timing point or if a user drags and drops a date of a current timing point to the selected object 61, the controller 180 is able to directly diagnose the operational state corresponding to the selected object 61.

Figure 9:
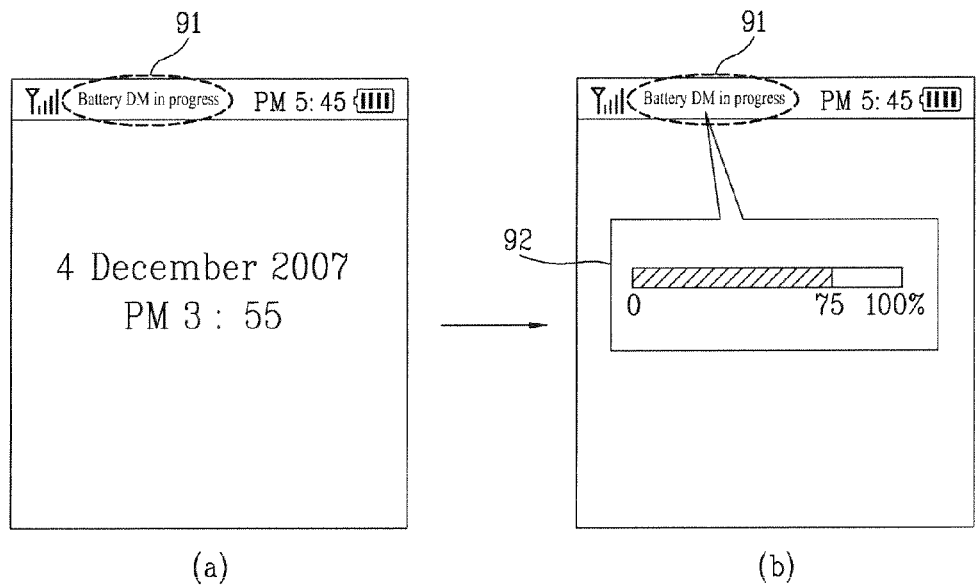
FIG. 9 is a diagram of screen configurations for displaying that an operational state diagnosis of a mobile terminal is in progress.

FIG. 9 is a diagram of screen configurations for displaying that an operational state diagnosis of a mobile terminal is in progress. Referring to FIG. 9, the controller 180 is able to display a first indicator object 91, which indicates that an operational state of the object 63 selected by the user in FIG. 7 is being diagnosed, on the display module 151.

In this case, the first indicator object 91 can be configured with at least one of a text, a moving picture, an animation or an icon, or any combination thereof. The first indicator object 91, as shown in FIG. 9(a), can be displayed on an indicator area of a stand-by screen. And, the first indicator object 91 can always be displayed on a specific area of the screen to facilitate a user to recognize that the operational state of the mobile terminal 100 is being diagnosed.

Referring to FIG. 9(b), if the first indicator object 91 is selected through the user input unit 130 or the touchscreen 151, the controller 180 is able to display a progress status window 92 indicating how far the operational state corresponding to the object 63 proceeds. In particular, if a user drags the first indicator object 91 displayed on the indicator area to an area outside of the indicator area, the controller 180 is able to display the progress status window 92.

If a user touches the first indicator object 91 once or plural times or if a user having touched the first indicator object 91 maintains the touched state for a predetermined period of time (long-touch), the controller 180 is able to display the progress status window 92. Moreover, the progress status window 92 can be simultaneously displayed together with the first indicator object 91 regardless of a key input or touch.

Figure 10:
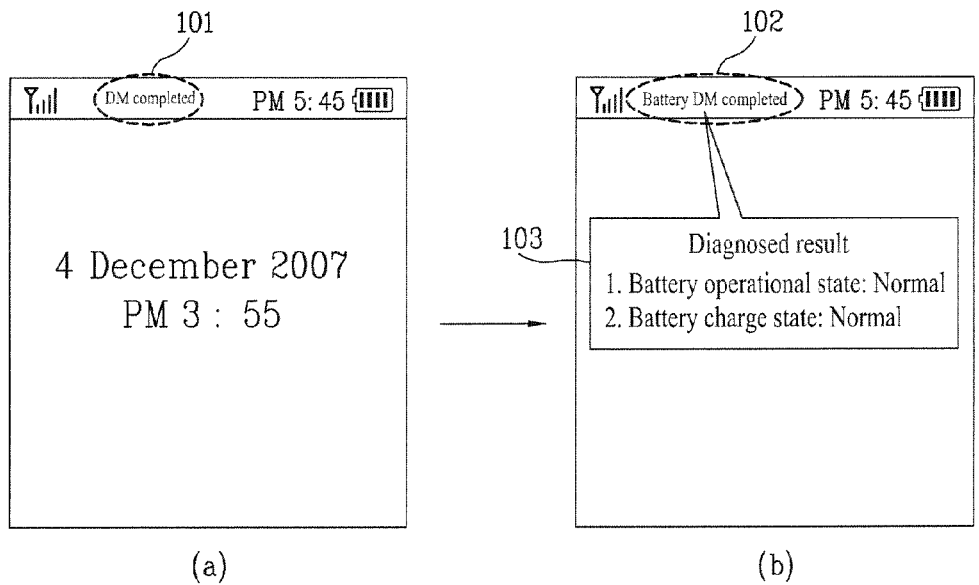
FIG. 10 is a diagram of screen configurations for displaying completion of an operational state diagnosis of a mobile terminal.

FIG. 10 is a diagram of screen configurations for displaying completion of an operational state diagnosis of a mobile terminal. Referring to FIG. 10(a), once the diagnosis of an operational state corresponding to the object 63 is completed, the controller 180 is able to display a second indicator object 101 indicating the diagnosis completion status on the display module 151. Of course, if the diagnosis of the operational state corresponding to the object 63 is completed, the controller 180 is able to directly display the diagnostic result without displaying the second indicator object 101.

The controller 180 is able to display a presence or non-presence of normality of the operational state corresponding to the object 63 on the display module 151 by comparing the diagnosed result to a preset reference value. In this case, the reference value is a normal state value indicating that the operational state of the battery is normal. And, the reference value can be factory-set in advance or can be provided from an external service provider server via the wireless communication unit 110.

The controller 180 transmits the content of the diagnosed result to the corresponding service provider server, receives a presence or non-presence of normality about the diagnosed result from the service provider server, and then displays the received result on the display module 151. In this case, the second indicator object 101 can be configured with at least one of a text, a moving picture, an animation or an icon, or any combination thereof. The second indicator object 101, as shown in FIG. 10(a), can be displayed on an indicator area of a stand-by screen. And, the second indicator object 101 can always be displayed on a specific area of the screen to facilitate a user to recognize that the operational state of the mobile terminal 100 is being diagnosed.

Referring to FIG. 10(b), if the second indicator object 101 is selected through the user input unit 130 or the touchscreen 151, the controller 180 is able to display the diagnosed result content of the operational state corresponding to the selected object 63. In particular, if a user drags the second indicator object 101 displayed on the indicator area to an outside of the indicator area, the controller 180 is able to display the diagnosed result content 103. If a user touches the second indicator object 101 once or plural times or if a user having touched the second indicator object 101 maintains the touched state for a predetermined period of time (long-touch), the controller 180 is able to display the diagnosed result content 103. Moreover, the controller 180 is able to simultaneously display the diagnosed result content 103 together with the second indicator object 101 regardless of a key input or touch.

According to a second embodiment, a diagnostic function provided to the above-described menu function of the first embodiment is provided to a stand-by screen. In particular, a user is facilitated to directly use the diagnostic function on the stand-by screen without separate menu manipulation. In the following description, a second embodiment is explained in detail with reference to FIG. 11 and FIG. 12.

Figure 11:
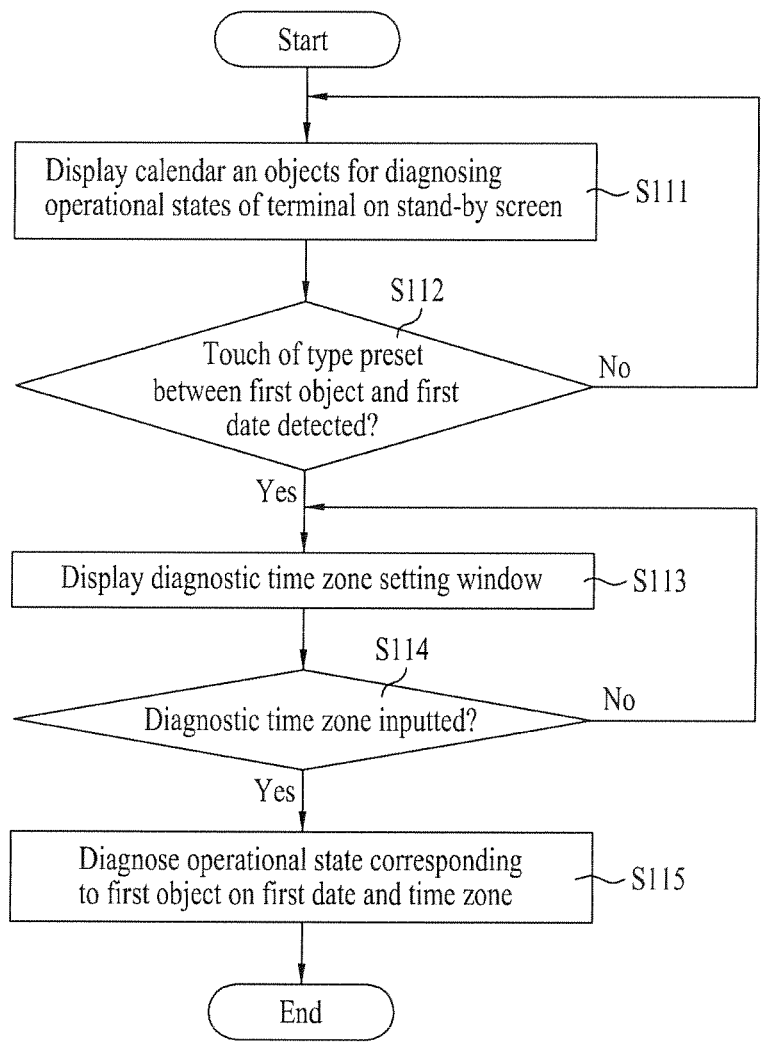
FIG. 11 is a flowchart for a method of diagnosing operational states of a mobile terminal according to a second embodiment.
Figure 12:
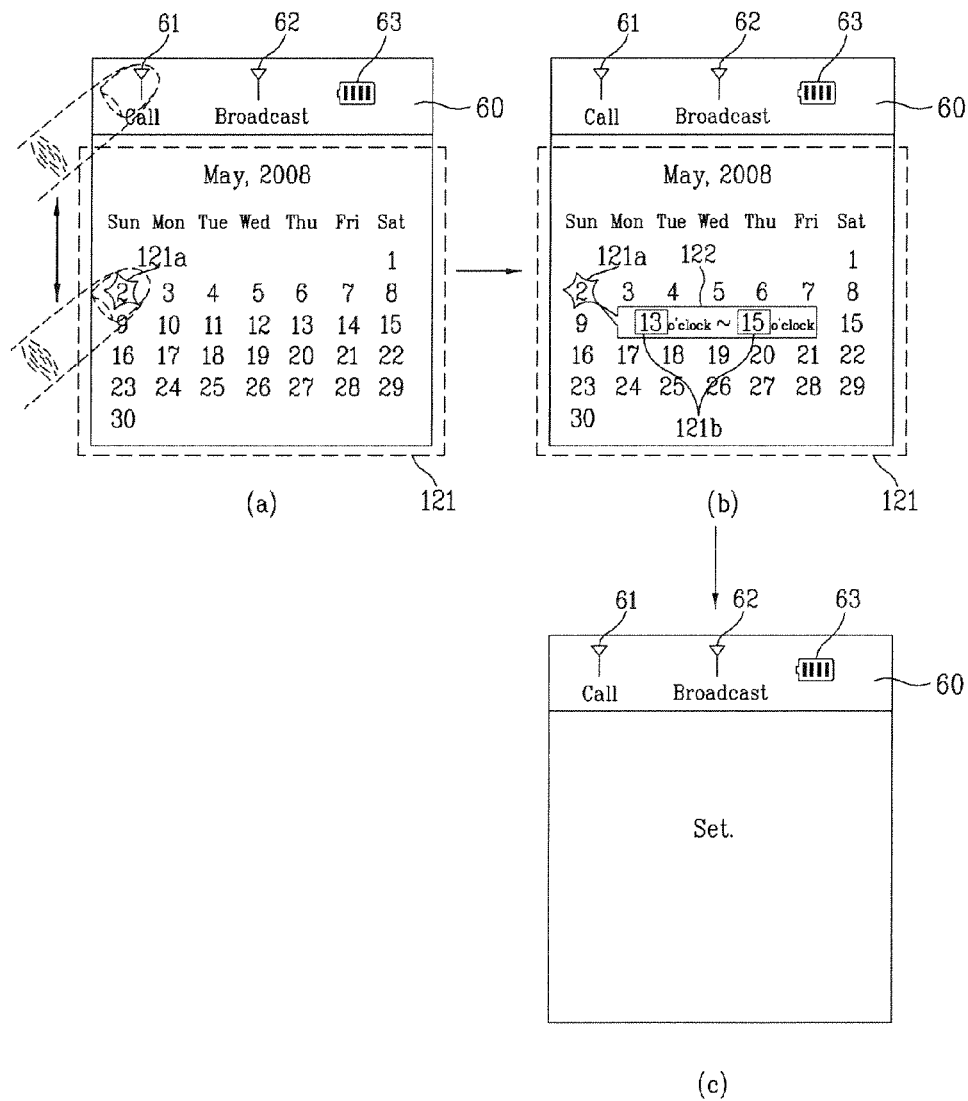
FIG. 12 is a diagram of screen configurations for a method of diagnosing operational states of a mobile terminal according to a second embodiment.

FIG. 11 is a flowchart for a method of diagnosing operational states of a mobile terminal 100 according to a second embodiment. FIG. 12 is a diagram of screen configurations for a method of diagnosing operational states of a mobile terminal 100 according to a second embodiment.

Referring to FIG. 11 and FIG. 12, the controller 180 displays a plurality of objects 61, 62 and 63 for diagnosing operational states of the mobile terminal 100 on a first area of a stand-by screen of the touchscreen 151 and also displays a plurality of diagnostic schedules on a second area of the stand-by screen [S111] [FIG. 12(a)].

In this case, the first area, as shown in FIG. 12(a), can become an indicator area 60. In particular, each of the objects 61, 62 and 63 plays a role as an indicator icon indicating each of the operational states of the mobile terminal 100 within the indicator area 60 prior to performing a diagnostic action. The diagnostic schedules are displayed as a calendar to facilitate a user to set the diagnostic schedules on the stand-by screen.

In case of detecting a touch preset between the first object 61 and a first date 121a [S112], the controller 180, as shown in FIG. 12(b), additionally displays a time setting window 122 for setting a diagnostic time zone 121b within the first date 121a [S113].

Referring to FIG. 12(b), if a user touches the first date 121a while touching the first object 61 or if a user touches the first object 61 while touching the first date 121a, the controller 180 is able to additionally display the time setting window 122.

Referring to FIG. 12(b), if a user drags and drops the first object 61 to the first date 121a or if a user drags and drops the first date 121a to the first object 61, the controller 180 is able to additionally display the time setting window 122.

If a diagnostic time zone 121b, as shown in FIG. 12(b), is inputted through the time setting window 122 [S114], the controller 180, as shown in FIG. 12(c), stores the set diagnostic date 121a and the diagnostic time zone 121b in the memory 160 by linking them with the first object 61. The controller 180 drives the diagnostic software provided to the memory 160 and then diagnoses the operational state corresponding to the first object 61 on the set diagnostic date 121a and the set diagnostic time zone 121b [S115].

If a user touches the date of the current timing point among the dates while touching the first object 61 or if a user touches the first object 61 while touching the date of the current timing point, the controller 180 drives the diagnostic software provided to the memory 160 and is then able to directly diagnose the operational state corresponding to the object 61.

If a user drags and drops the first object 61 to the date of the current timing point or if the user drags and drops the date of the current timing point to the first object 61, the controller 180 is able to directly diagnose the operational state corresponding to the object 61. It will be apparent to those skilled in the art that various modifications and variations can be made in the present disclosure without departing from the spirit or scope of the device and method disclosed herein.

For instance, the above-described device and method can be implemented in a program recorded medium as computer-readable codes. The computer-readable media may include various kinds of recording devices in which data readable by a computer system are stored. The computer-readable media may include ROM, RAM, CD-ROM, magnetic tapes, floppy discs, optical data storage devices, and the like, for example, or may also include carrier-wave type implementations (e.g., transmission via Internet). And, the computer can include the control unit 180 of the mobile terminal 100.

Thus, it is intended that the present disclosure covers the modifications and variations of this device and method, provided they come within the scope of the appended claims and their equivalents.

What is claimed is:

1. A mobile communication terminal comprising:
    a touchscreen configured to display an object for diagnosing whether an operation state of at least one component of the mobile communication terminal is normal;
    a wireless communication unit configured to receive a reference value that is a normal state value for the operation state of the at least one component;
    a memory unit configured to store the received reference value;
    an input unit configured to receive an input to select the displayed object; and
    a controller configured to:
        diagnose the operation state of the at least one component in response to a selecting of the displayed object;
        control the touchscreen to display a first indicator object in a specific display region of the touchscreen, the first indicator object indicating that the operation state of the at least one component is being diagnosed;
        when the first indicator object is moved to an area outside of the specific display region in response to a dragging of the first indicator object, control the touchscreen to display progress state information indicating a current diagnosis process state of the at least one component;
        compare the reference value to a result of the diagnosis of the operation state of the at least one component;
        determine whether the operation state of the at least one component is normal based on a result of the comparison;
        when the diagnosis of the operation state of the at least one component is completed, control the touchscreen to display a second indicator object in the specific display region, the second indicator object indicating completion of the diagnosis; and
        when the second indicator object is moved to an area outside of the specific display region in response to a dragging of the second indicator object, control the touchscreen to display a diagnosis report indicating an end result of the diagnosis based on a result of the determination.

2. The mobile communication terminal of claim 1, wherein the controller is further configured to diagnose the operation state of the at least one component at a preset date and time.

3. The mobile communication terminal of claim 2, wherein the controller is further configured to control the touchscreen to display a diagnostic schedule module for setting the date and time.

4. The mobile communication terminal of claim 1, wherein:
    the input unit comprises at least one key; and
    the displayed object is selected via a key of the at least one key of the input unit.

5. The mobile communication terminal of claim 1, wherein:
    the controller is further configured to control the touchscreen to display a menu; and
    the controller is further configured to control the touchscreen to display the object in response to a selecting of the menu via an input received at the input unit.

6. A method for diagnosing components of a mobile terminal, the method comprising:
    receiving, via a wireless communication unit, a reference value for indicating a normal state value for an operation state of at least one component;
    storing, in a memory unit, the received reference value;
    displaying, on a touchscreen, a menu item for diagnosing whether the operation state of the at least one component is normal;
    diagnosing the operation state of the at least one component in response to a selecting of the displayed menu item;
    displaying, in a specific display region of the touchscreen, a first indicator object indicating that the operation state of the at least one component is being diagnosed;
    when the first indicator object is moved to an area outside of the specific display region in response to a dragging of the first indicator object, displaying progress state information indicating a current diagnosis process state of the at least one component;
    comparing the reference value to a result of the diagnosis of the operation state of the at least one component;
    determining whether the operation state of the at least one component is normal based on a result of the comparison;
    when the diagnosis of the operation state of the at least one component is completed, displaying, in the specific display region, a second indicator object indicating completion of the diagnosis; and
    when the second indicator object is moved to an area outside of the specific display region in response to a dragging of the second indicator object, displaying a diagnosis report indicating an end result of the diagnosis based on a result of the determination.

7. The method of claim 6, further comprising:
displaying a time table in response to the selecting of the displayed menu item; and
receiving a selecting, via the displayed time table, of a time for diagnosing the operation state of the at least one component.

8. The method of claim 6, further comprising:
diagnosing the operation state of the at least one component in response to a dragging and dropping of the displayed menu item to a specific portion of the touchscreen.

9. The method of claim 7, further comprising:
scheduling the time for diagnosing the operation state of the at least one component in response to a dragging and dropping of the displayed menu item in a time slot of the time table.

10. The method of claim 7, further comprising:
scheduling the time for diagnosing the operation state of the at least one component in response to a dragging and dropping of a time slot of the time table to the displayed menu item.

11. The method of claim 6, wherein the menu item comprises at least a graphical icon, an indicator, a hyperlink, or text displayed on the touchscreen.

* * * * *